US011076224B2

(12) United States Patent
Zielinski et al.

(10) Patent No.: US 11,076,224 B2
(45) Date of Patent: Jul. 27, 2021

(54) PROCESSING OF DATA OF A VIDEO SEQUENCE IN ORDER TO ZOOM TO A SPEAKER DETECTED IN THE SEQUENCE (71) Applicant: ORANGE, Issy-les-Moulineaux (FR)

(72) Inventors: Andrzej Zielinski, Chatillon (FR); Robert Warzocha, Chatillon (FR); Robert Kolodynski, Chatillon (FR); Stéphane Ragot, Chatillon (FR); Jérôme Daniel, Chatillon (FR); Marc Emerit, Chatillon (FR)

(73) Assignee: ORANGE ( * ) Notice: Subject to any disclaimer, the term of this patent is extended or adjusted under 35 U.S.C. 154(b) by 0 days.

(21) Appl. No.: 16/769,947

(22) PCT Filed: Dec. 4, 2018

(86) PCT No.: PCT/FR2018/053097
§ 371 (c)(1),
(2) Date: Jun. 4, 2020

(87) PCT Pub. No.: WO2019/110913
PCT Pub. Date: Jun. 13, 2019

(65) Prior Publication Data
US 2020/0389722 A1  Dec. 10, 2020

(30) Foreign Application Priority Data

Dec. 5, 2017  (FR) ..................... 1761643

(51) Int. Cl.
H04R 3/00 (2006.01)
H04R 1/32 (2006.01)
(Continued)

(52) U.S. Cl.
CPC .......... H04R 1/326 (2013.01); G10L 21/0216 (2013.01); H04N 5/23219 (2013.01);
(Continued)

(58) Field of Classification Search
CPC ...................................................... H04R 3/00
See application file for complete search history.

(56) References Cited

U.S. PATENT DOCUMENTS 6,707,489 B1 * 3/2004 Maeng .................. G01S 3/7864
348/14.08
7,692,685 B2 * 4/2010 Beal ........................ H04N 7/15
348/169
(Continued)

FOREIGN PATENT DOCUMENTS

CN   1997161 A    7/2007
EP   2375741 A1  10/2011
(Continued)

OTHER PUBLICATIONS

Written Opinion of the International Searching Authority dated Feb. 12, 2019 for corresponding International Application No. PCTFR2018/053097, filed Dec. 4, 2018.
(Continued)

Primary Examiner — Olisa Anwah
(74) Attorney, Agent, or Firm — David D. Brush; Westman, Champlin & Koehler, P.A.

(57) ABSTRACT

Method and device for processing a video sequence containing a succession of images of one or more participant speakers, captured by a wide-angle camera. The method includes: capturing sound using a microphone having a plurality of sensors for capturing a sound field; processing the audio data captured by the microphone in order to determine at least one direction of origin of sound coming from a participant, relative to an optical axis of the wide-angle camera; generating a signal including data concerning the direction of origin of the sound relative to the optical axis of the camera, for the purpose of utilizing the signal when rendering the captured images by zooming into an area
(Continued)

around the participant emitting the sound for which the direction of origin corresponds to the data of the signal.

14 Claims, 7 Drawing Sheets

(51) Int. Cl.
  *G10L 21/0216* (2013.01)
  *H04N 5/232* (2006.01)
  *H04N 7/14* (2006.01)

(52) U.S. Cl.
  CPC ......... *H04N 5/23296* (2013.01); *H04N 7/147* (2013.01); *H04R 3/005* (2013.01); *G10L 2021/02166* (2013.01)

(56) References Cited

U.S. PATENT DOCUMENTS

| | | | | |
|---|---|---|---|---|
| 8,098,843 | B2* | 1/2012 | Kawaguchi | G01S 3/8083 381/92 |
| 2003/0081504 | A1* | 5/2003 | McCaskill | G01S 3/8083 367/118 |
| 2005/0008169 | A1* | 1/2005 | Muren | H04R 27/00 381/92 |
| 2009/0128617 | A1* | 5/2009 | Zhan | G01S 3/8034 348/14.12 |
| 2012/0320143 | A1* | 12/2012 | Chu | H04N 7/15 348/14.08 |
| 2014/0362253 | A1* | 12/2014 | Kim | G06T 7/70 348/231.4 |
| 2015/0054943 | A1* | 2/2015 | Zad Issa | H04R 29/004 348/135 |
| 2015/0341545 | A1* | 11/2015 | Lee | H04N 5/23218 348/14.16 |
| 2016/0140396 | A1* | 5/2016 | Feng | H04N 7/15 348/14.08 |
| 2016/0360150 | A1* | 12/2016 | Onno | H04N 21/44218 |

FOREIGN PATENT DOCUMENTS

| | | |
|---|---|---|
| EP | 2765791 A1 | 8/2014 |
| WO | 02079792 A2 | 10/2002 |
| WO | 2004100546 A1 | 11/2004 |
| WO | 2005015954 A2 | 2/2005 |
| WO | 2009152158 A1 | 12/2009 |

OTHER PUBLICATIONS

International Search Report dated Feb. 12, 2019 for corresponding International Application No. PCTFR2018/053097, filed Dec. 4, 2018.

English translation of the Written Opinion of the International Searching Authority dated Feb. 22, 2019 for corresponding International Application No. PCT/FR2018/053097, filed Dec. 4, 2018.

* cited by examiner

601: Audio rendering

FIG. 7b

PROCESSING OF DATA OF A VIDEO SEQUENCE IN ORDER TO ZOOM TO A SPEAKER DETECTED IN THE SEQUENCE

CROSS-REFERENCE TO RELATED APPLICATIONS

This Application is a Section 371 National Stage Application of International Application No. PCT/FR2018/053097, filed Dec. 4, 2018, the content of which is incorporated herein by reference in its entirety, and published as WO 2019/110913 on Jun. 13, 2019, not in English.

FIELD OF THE DISCLOSURE

The present invention relates to the processing of video sequence data, for example from videoconference signals from a webcam, in particular for zooming in real time (or near-real time) into an area in which a participant is recognized as active.

BACKGROUND OF THE DISCLOSURE

Figure 1A:
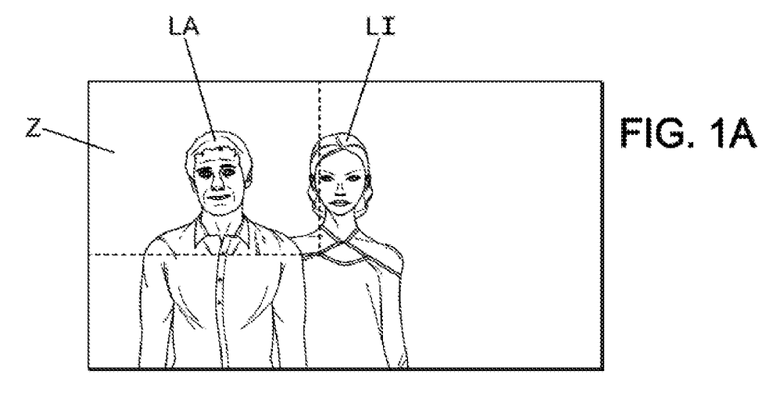
FIGS. 1A and 1B illustrate the principle of zooming to an active participant detected in a video sequence.
Figure 1B:
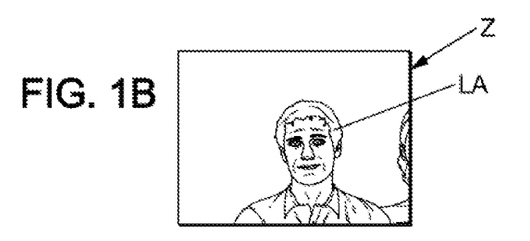

With reference to FIG. 1A, two parties LA and LI are presented by way of example, interacting with a user receiving the images from a remote webcam and filming these two parties LA and LI. Party LA is active, while the other party LI is not making any sound. The desire is then to zoom into the area Z of the successive images for example to show in particular the face, or even the upper body, of the active participant LA who is located in this area Z, as illustrated in FIG. 1B.

Techniques are known for obtaining such functionality. For example, one technique consists of using two cameras, one to perform the zooming in the images it captures (as illustrated in FIGS. 1A and 1B), and another camera to detect in particular the lip movements of the people being filmed and then zoom to the face whose lips are moving. However, such an embodiment requires two cameras, therefore additional equipment which may result in an associated cost. Furthermore, in terms of robustness, if the faces are far from the camera, it is difficult to detect lip movement in a satisfactory manner.

SUMMARY

The present invention improves the situation.

To this end, it proposes a method for processing a video sequence containing a succession of images of one or more participant speakers, captured by a wide-angle camera, the method comprising:
 a capturing of sound using a microphone comprising a plurality of sensors for capturing a sound field;
 a processing of the audio data captured by the microphone in order to determine at least one direction of origin of sound coming from a participant, relative to an optical axis of the wide-angle camera;
 a generation of a signal comprising data concerning said direction of origin of the sound relative to the optical axis of the camera, for the purpose of utilizing said signal when rendering the captured images by zooming into an area around the participant emitting the sound for which the direction of origin corresponds to said data of the signal.

"Participants" in the general sense is understood to mean any person capable of producing sound, for example speech, or even music, or other sound.

Finally, "wide-angle" camera is firstly understood to mean the possibility of digitally zooming in on the images captured by the camera at the moment when these images are rendered on a screen. However, the term more generally also includes the possibility of a mobile camera capable of being focused and/or rotationally oriented in a direction corresponding to the one from which the sound is propagating.

Said microphone may be of the ambisonic type.

The term "ambisonic" here is interpreted to be related to the processing referred to as "encoding and processing in the ambisonic field" which enables the determination of a direction of origin of sound coming from a source, possibly for several sources at a time. The microphone itself may for example be of the "spherical" type and comprise a plurality of sensors such as piezoelectric capsules, for example as illustrated in document WO-2005/015954 (reference S in FIG. 1). It may then be arranged to process, downstream of the microphone, the captured audio data in order to obtain a representation of the sound scene and more particularly a direction of propagation of a sound relative to at least one given axis, this sound coming from a sound source that is primarily active (compared to other sources or only in the sound scene). This direction of propagation can be obtained for example by a technique of source separation (in particular "blind" source separation) and identification of the directions of propagation of the detected sources. The direction(s) of propagation can be obtained more simply by processing such as "beamforming" or by analyzing a multi-sensor audio signal converted to the format called "B-format" and analyzed using the DirAC method (for "Directional Audio Coding") where an intensity vector is calculated by frequency bands and angles (azimuth, elevation) can be extracted.

Of course, in the event of several active participants being identified (or even when no active participant is detected in an area of interest which typically corresponds to the field of view of the webcam), it may be arranged to zoom out in the image in order to have several parties at the same time within the field of the image (or in general the complete video scene). Technically, it is indeed possible to identify several sound sources and to associate respective angles to these sound sources in order to define the image width necessary to have, within the field of the rendered image, all participants for whom activity has been detected.

As a variant of an ambisonic microphone of the above type, the sensors which it comprises may be arranged linearly or even as a tetrahedron or the like, in order to capture, in a general manner, a sound field for which the direction of a sound source can be determined by processing, in the manner of a "microphone antenna", each microphone corresponding to a sensor. In one possible embodiment, the sensors may be distributed by discretizing a sphere as a tetrahedron with four sensors for order 1, or with more sensors for a higher ambisonic order (referred to as HOA for "High-Order Ambisonics").

Thus, in one embodiment, the method comprises a processing of the sound field captured by the microphone and representative of a sound scene comprising at least one sound source corresponding to an active participant emitting a sound for which the direction of propagation is determined relative to the optical axis of the camera.

The sound field processing may include what is referred to as "source separation" (or "blind separation") processing, to detect the aforementioned source and determine the corresponding direction of propagation of the sound the source is emitting.

Alternatively, a so-called "beamforming" type of processing may be provided. In particular, it may be advantageous in this embodiment to provide energy maximization processing as a function of the multiple beams captured by the microphone, in order to determine the direction of propagation of the sound coming from said source. It should be noted here that "beamforming" is generally used to focus a microphone antenna in a direction (that of the source) and thus improve the ratio of direct to reverberant sound. Here, this technique can be used to find the direction of propagation of sound from a source on a grid of several possible directions, by looking for the direction for which the energy is the greatest.

In another variant, an analysis of DirAC-type 3D audio scenes can be used to obtain the direction of at least one source.

In one embodiment, the microphone and camera are placed in respective positions spatially offset from one another, the method comprising a calibration prior to the processing of the audio data (and possibly with compensation integrated into the processing), in order to correct the image area to be zoomed while taking into account the spatial offset between microphone and camera.

This calibration (and compensation) may comprise for example:
- comparing a position of the face of an active participant in an image captured by the camera and the direction of propagation of the sound from this active participant, captured by the microphone,
- determining said spatial offset based on the comparison, and storing a value of the spatial offset, in order to take said offset value into account to define the area for the zoom.

It may further be arranged to detect the shape and size of the face in the images captured by the camera during the abovementioned calibration (and compensation).

In one embodiment where the camera and the microphone capture videoconference data intended to be transmitted by a transmitting device towards a receiving device, the method may comprise the determination of a value of an estimated angle between the direction of propagation and the optical axis of the camera, and data concerning said angle value are then added by the transmitting device to a stream of the videoconference data.

This addition may be carried out inband, in other words by adding the angle data as metadata integrated into the transmitted audio stream, or outband, by transmitting these angle data as an additional stream supplementing the audio and video streams, for example by sending these angle data via a "DataChannel" during an audio-video communication using WebRTC technology.

Upon receiving these angle data, the receiving device can thus zoom to the area of the active participant in the image data received from the transmitting device, using the data of said angle value.

The data of said angle value may be transmitted with the videoconference data stream, for example in the metadata.

In one possible embodiment, described below, the data of said angle value are transmitted with the videoconference data stream (called the "DataChannel") via a switched telephone network type of network (called "WebRTC").

In a video call, the local video is often presented as a reduced image (thumbnail) on the remote video. In one possible embodiment of the invention, the zoom to the area of the active participant can also be applied to the local video, so that the local participants are seeing the video which is actually being transmitted remotely. The invention can thus also be applied to the transmitter device.

In one possible variant, the zoom in the video to be transmitted to the remote device may be directly applied, to avoid having to perform the zoom at the receiving device and thus avoid systematically transmitting the angle data as well as the complete video of the scene (wide angle). Such an embodiment enables reducing the necessary bandwidth.

The present invention also relates to a device comprising a wide-angle camera and a microphone comprising a plurality of sensors for capturing a sound field, the camera and the microphone being connected to a processing circuit for implementing the method presented above.

The device may comprise an interface for transmitting the data of said angle value with the videoconference data stream, acting as a transmitting device.

The device may comprise an interface for receiving and a circuit for processing the data of said angle value with the received videoconference data stream in order to perform the zoom in the received images according to said received angle value, acting as a receiving device.

The present invention also relates to a computer program, comprising instructions for implementing the above method when the instructions are executed by a processor of a processing circuit.

BRIEF DESCRIPTION OF THE DRAWINGS

Other features and advantages of the invention will be apparent from reading the description of some exemplary embodiments detailed below, and from examining the appended drawings in which.

DETAILED DESCRIPTION OF ILLUSTRATIVE EMBODIMENTS

Below, an application of the invention is described in the capture, processing, transmission/reception, and processing for rendering, in particular of videoconference data. Nevertheless, the determination of the direction of propagation of the sound coming from an active participant, within the meaning of the invention, can be implemented in other possible applications, such as an automatic zoom to an active participant in a television studio, or an automatic zoom to a participant filmed when the shooting must be done quickly (for example for journalistic coverage or a documentary).

Figure 2A:
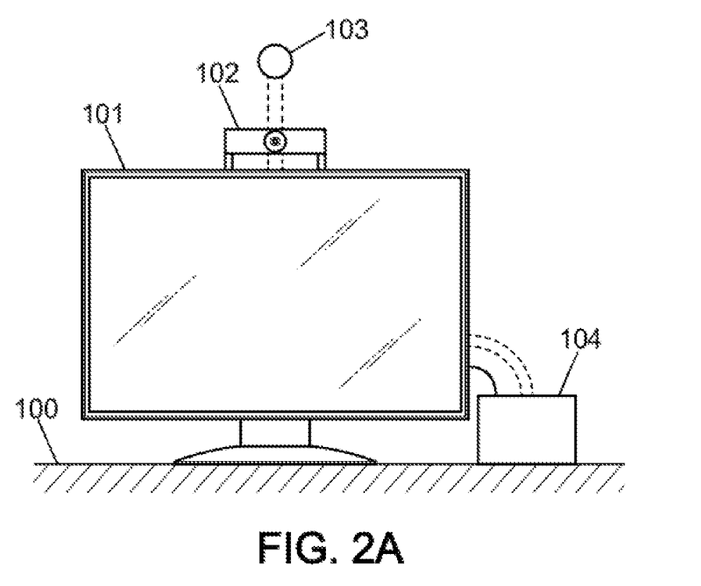
FIGS. 2A and 2B illustrate in particular the aforementioned wide-angle camera and ambisonic microphone, respectively from the front and from the side.
Figure 2B:
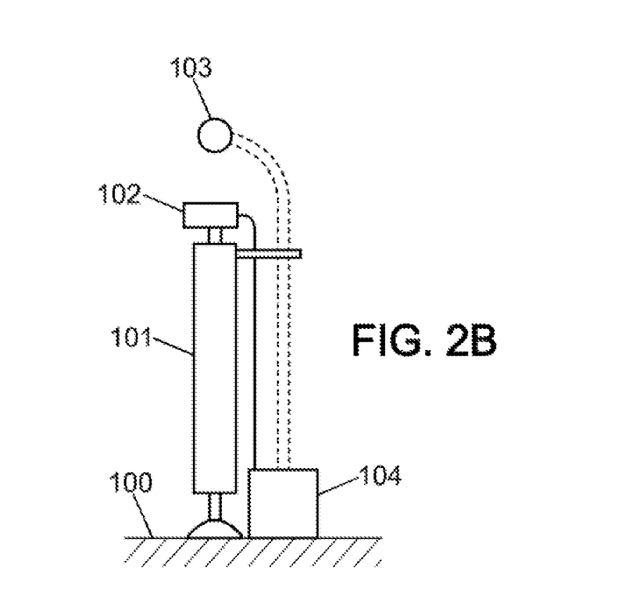

First we will refer to FIG. 2A, in which a wide-angle camera 102, here a webcam, is represented in a front view, connected in the example shown to a communicating device 104 such as for example a "video decoder" or "set-top box", itself connected to a television 101 and having a network connection, for example by means of an "Internet box". The television 101 carries the camera 102 and an ambisonic microphone 103 near the camera. The support 100 for the television 101 is shown here to illustrate that the microphone 103 has a fixed position relative to the camera.

Ideally, the position of the microphone 103 coincides (within a range of tolerance) with that of the optical center of the camera. However, this is difficult to implement in actual practice. Furthermore, it is not recommended to attach the microphone 103 to the camera 102 directly because of the sounds reflected by the camera that could be picked up by the microphone.

To overcome this difficulty, it could be arranged to design the microphone in the form of one or two spherical half-shells, one on each side of the camera, taking into account and correcting for a possible degradation of the captured ambisonic components.

In an alternative embodiment, it could be arranged to correct the effect of the non-coincidence of the optical axis of the camera with the position of the microphone by calibrating the detection of the origin of the sound. For example, this calibration can be carried out by presenting the user of the camera 102 with his or her image on the television 101, on which a marker is superimposed—for example a circle of reduced size and of a predetermined color—and asking the user to speak while indicating for example with a remote control the position of a marker on the image of the user's mouth on the screen, and doing so while positioning himself or herself at a distance from the camera and microphone that is to be used subsequently. In yet another alternative, the camera can perform facial detection to identify the direction of the sound and possibly determine (by regression based on the size of the detected face for example) the actual distance between the face and the camera, which makes it possible to correct, by trigonometric relations, the angle of propagation of the sound relative to the optical axis of the camera.

Figure 8:
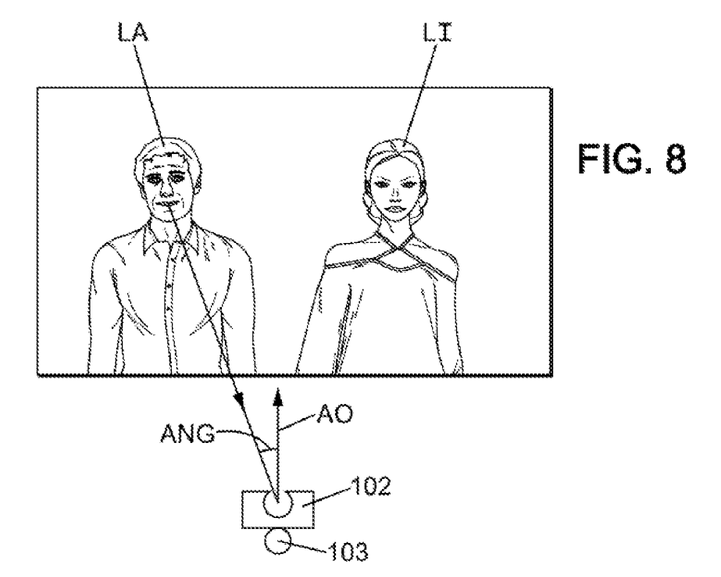
FIG. 8 illustrates the angle ANG formed by the direction of the sound coming from the active participant LA and the optical axis AO of the camera.

Of course, this correction linked to the lack of coincidence of the position of the microphone with the optical axis or optical center of the camera is an optional embodiment, and at the very least, with reference to FIG. 8, an angle ANG is ultimately obtained (corrected or uncorrected) formed by the direction of the sound from the active participant LA and the optical axis AO of the camera 102. To this end, the audio data captured by the microphone 103 is processed (for example by separation of sources in the sound scene captured by the microphone and determination of the directions of propagation of the sound coming from these sources, or even more simply by a beamforming type of technique involving consideration of multiple acoustic beams and filtering, with energy maximization as a function of multiple beams, for which the ambisonic microphone or more generally a microphone with a plurality of sensors such as piezoelectric capsules for example (arranged linearly or in several dimensions, for example in a tetrahedron) may be used as well. In variants of the invention as indicated above, a source separation method or a DirAC type of analysis may be applied to an ambisonic signal in B-format.

Once this processing has been carried out, it may then be provided to transmit the captured audio data, captured image data, and data concerning this audio source direction (or audio source directions in the case of several sources), for example in the form of one (or more) angle value(s) ANG.

Upon reception of the direction data by a remote user, the video decoder can read the angle value ANG, zoom to the area corresponding to this angle in the image data received, and display the accordingly zoomed image on its reception screen.

The angle value ANG may be represented by data concerning the azimuthal angle and elevation angle relative to the optical axis AO.

These steps are detailed with reference to FIG. 3, in which first steps 301 and 302 respectively consist of audio capturing by the ambisonic microphone 103 and image data capturing by the wide-angle camera 102. The capturing of audio data 301 is followed by audio preprocessing 303 to determine the above-mentioned angle ANG. Here, the value of this angle characterizing the acoustic direction of the active participant relative to the optical axis of the camera is transmitted among the metadata in step 304. As a variant, these data may be integrated into the stream of captured audio data 305 (with an appropriate metadata declaration header for example). In step 310, the stream of metadata, captured audio data 305, and captured video data 306 are multiplexed to be transmitted via a network NET, for example an IP network with a Web server hosting a WebRTC type service (typically with an additional signaling server for the exchange of media capacities using the SDP protocol) illustrated by reference 13 in FIG. 5.

Typically, two angles can be transmitted for each source, by considering spherical coordinates with the microphone as the reference point. These are the azimuth and the elevation. In a simplified embodiment where variations in elevation are not relevant (for example when the participants are seated around a table of predetermined circular shape), solely the azimuth may be calculated and transmitted.

In one embodiment, the audio and image data are transmitted over an IP network using WebRTC technology, which is based on media transport using the RTP protocol (or its secure variants such as SRTP). The developer of the video-conferencing service can then use API type software building blocks (typically in the JavaScript language) 'PeerConnection' and 'GetUserMedia' of WebRTC to access the camera and establish the streams.

An audio signal from analysis processing of the scene captured by the microphone includes the direction data and, when WebRTC technology is used, this direction data can be transmitted using the 'DataChannel' API which makes it possible to transmit data, typically in JSON (JavaScript Object Notation) form, therefore with a structured XML-type format of the form: {"azimuth": theta, "elevation": phi} where theta and phi correspond to the values (possibly integers, if they are expressed in degrees) of the direction angles (azimuth, elevation).

When several sources are detected in the scene of interest typically limited to the camera's field of view the data may take the form of a table:
[{"azimuth": theta1, "elevation": phi1}, {"azimuth": theta2, "elevation": phi2} ]
where theta1, phi1 are the coordinates of source 1, and theta2, phi2 are the coordinates of source 2.

When no audio source is detected typically within the camera's field of view an empty table may be transmitted: [ ].

An exemplary embodiment consists of executing, in the block implementing the sound scene analysis, a local transmission of direction data using the OSC protocol (Open Sound Control) to a local Web server which retransmits the direction data using a WebSocket type of Web protocol to the Web client managing the user interface for accessing the videoconferencing service. In one possible variant, the direction data may be transmitted by other methods, for example by transmitting this data to a virtual sound card in the form of a "virtual" audio signal and by accessing this sound card (for example by calling the "GetUSerMedia" API of WebRTC).

Upon reception 610, the streams are demultiplexed (or even decoded from compression) into:
- an audio data stream 605,
- an image data stream 606, and
- a metadata stream 604 which then includes the value of the angle ANG, this stream possibly integrated into the audio data stream, or transmitted separately (for example by a "DataChannel" according to WebRTC technology).

This last ANG is then used in step 603 for:
- determining an area Z of presence of an active participant LA in the image for which the data are received in step 606,
- digitally zooming into the image for which the data are received, to the area Z thus determined.

The image thus zoomed into can then be displayed in step 602 on a television or the like, in addition with an audio rendering 601 of the sound captured by the microphone 103. It will thus be understood that the microphone 103 serves not only to capture the sound of the sound scene illustrated in FIG. 1A but also to determine the angle ANG of the direction of the sound coming from the active participant LA.

Figure 3:
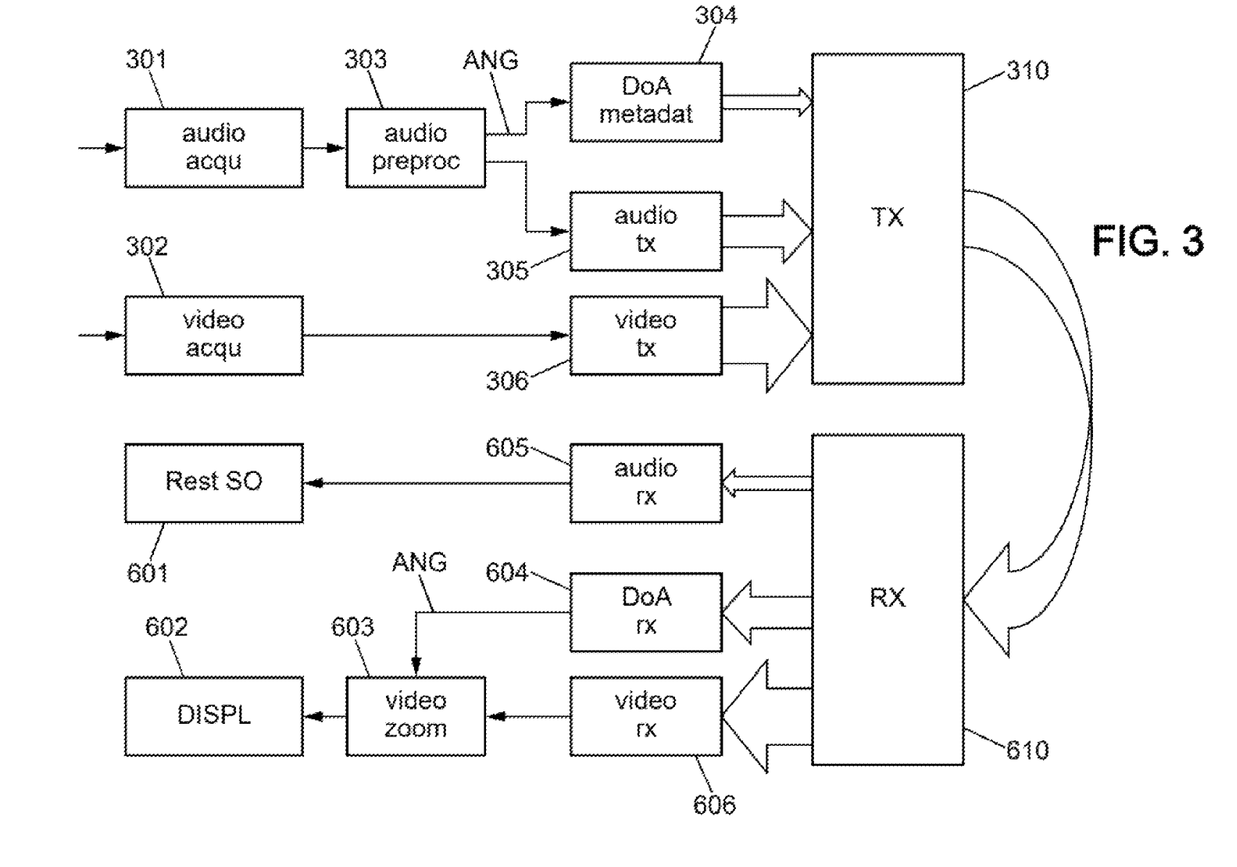
FIG. 3 illustrates the main steps of the method in an exemplary embodiment of the invention.

The steps of FIG. 3 can be implemented by executing a computer program on the device 104, in order to determine the angle ANG and transmit the data including the value of this angle in particular. For this purpose, the invention relates to such a computer program executed on the device 104, as well as the device 104 itself comprising a processing circuit that at least includes, as illustrated in FIG. 4:
- an interface INT for receiving image and audio data from the camera 102 and the microphone 103,
- a processor PROC1 arranged to read and execute the instructions of said computer program in order to implement the method (typically at least steps 301, 302, 303, 304, 305, 306, 310 of FIG. 3), and
- a memory MEM1 storing at least these instructions.

The device 104 may further comprise an output interface OUT for controlling a television 201 (and associated audio rendering means 202 such as speakers, headphones, or the like), in order to display images of the videoconference in progress having one or more remote participants, while also zooming in on the remote participant who is active.

Thus, the device 104 may also be arranged to perform this zoom on the basis of receiving the angle data ANG. More generally, the present invention also relates to a computer program executed on a device (such as device 104 for example), and comprising instructions for implementing steps 610, 605, 604, 606, 603, 601 and 602 of the method illustrated in FIG. 3. It also relates to the device itself, comprising a processing circuit for executing this program and which includes, as illustrated in FIG. 5:
- an interface 12 for receiving image, audio, and angle ANG data from the network 13,
- a processor 10 arranged to read and execute the instructions of said computer program in order to implement the method (at least steps 610, 605, 604, 606, 603, 601 and 602), and
- a memory 11 storing at least these instructions.

Figure 4:
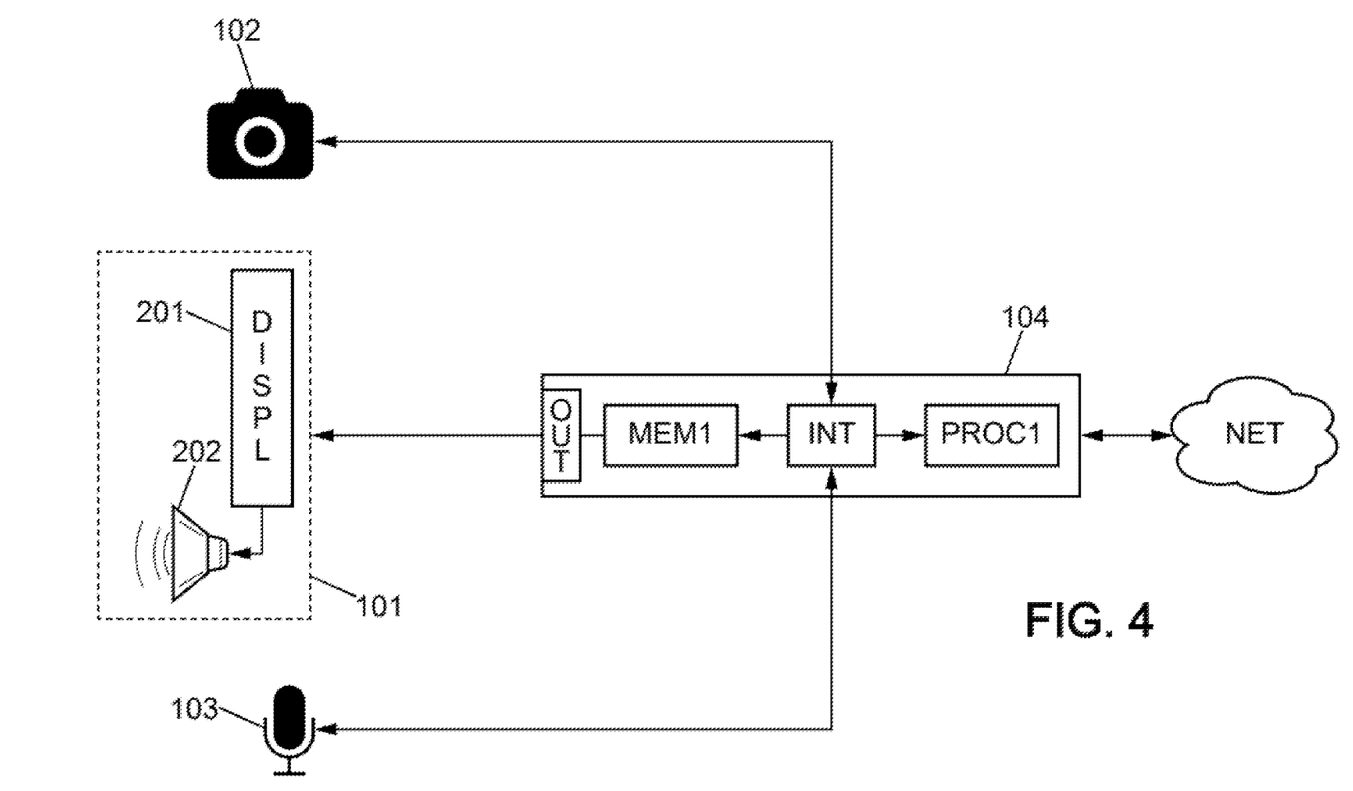
FIG. 4 illustrates a first device 104 for implementing at least part of the method of FIG. 3, for capturing and transmitting videoconference data.
Figure 5:
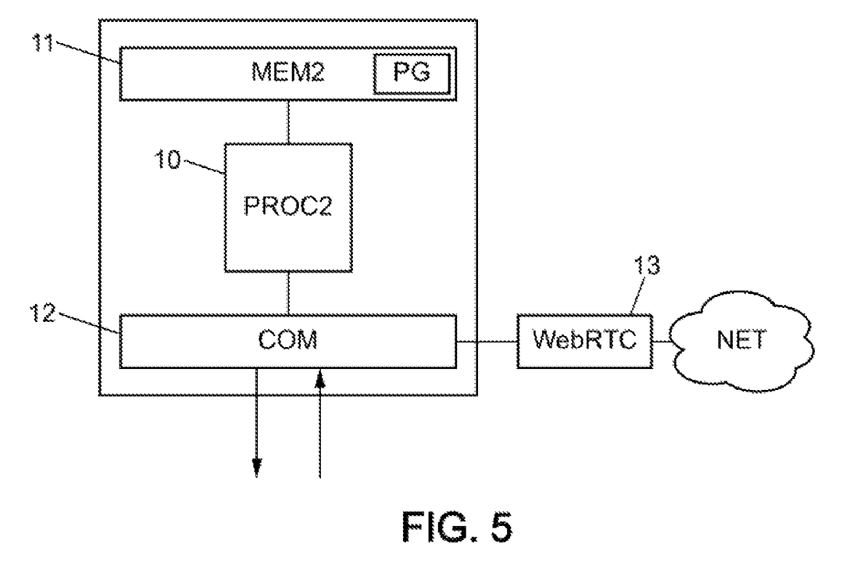
FIG. 5 illustrates a second device (which may be identical to the first device) for implementing another part of the method of FIG. 3, for receiving and restoring videoconference data, FIGS. 6a, 6b, and 6c respectively illustrate the direction of propagation in a coordinate system in spherical coordinates, then Cartesian coordinates for defining the zoom, and the relationship between the direction of propagation of the sound and the location of the image area to be zoomed to, FIGS. 7a, 7b, and 7c illustrate the case of an azimuthal offset (height d) between the camera 102 and the microphone 103.

More generally, the present invention relates to an encompassing computer program whose instructions can be distributed between the transmitting device of FIG. 4 and the receiving device of FIG. 5.

Figure 6A:
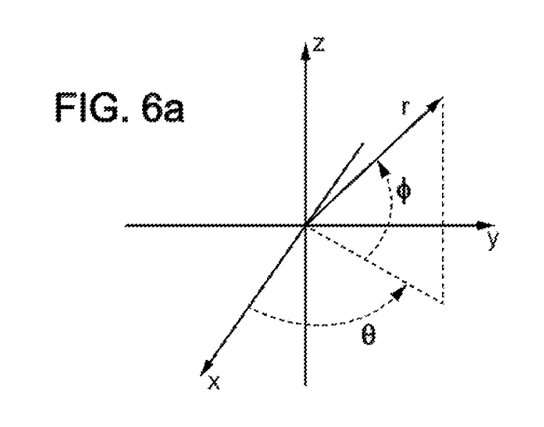

We now detail a first embodiment which assumes that the wide-angle camera 102 and the microphone 103 are coincident. In this case, the spherical coordinates of the audio source (r, theta, phi, denoted below as r, $\theta$, $\phi$) are defined using the same coordinate system convention as the camera. A reminder of this convention is provided in FIG. 6a.

Figure 6B:
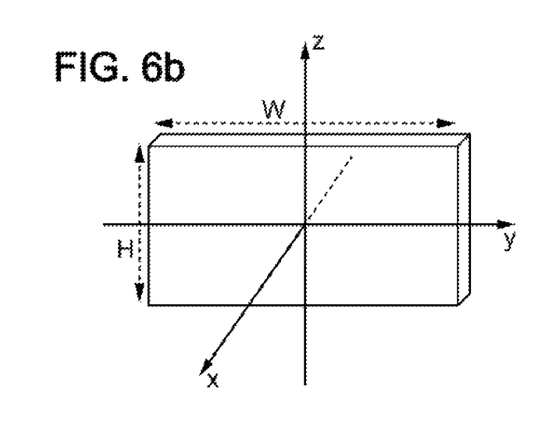

As for FIG. 6b, it is a reminder of the convention of a 3D coordinate system with a horizontal plane (x, y) and an elevation along the z axis. The convention applied here has the origin at the center of an image of size W×H where W and H are respectively the width and the height of the image (in number of pixels). The following table summarizes the classical resolutions in video and TV imaging:

| Resolution | W × H (number of pixels) |
|---|---|
| QVGA | 320 × 240 |
| VGA | 640 × 480 |
| HD (720 p) | 1280 × 720 |
| Full HD (1080 p) | 1920 × 1080 |
| UHD Ready | 2880 × 1620 |
| UHD (Quad HD) | 3840 × 2160 |

Figure 6C:
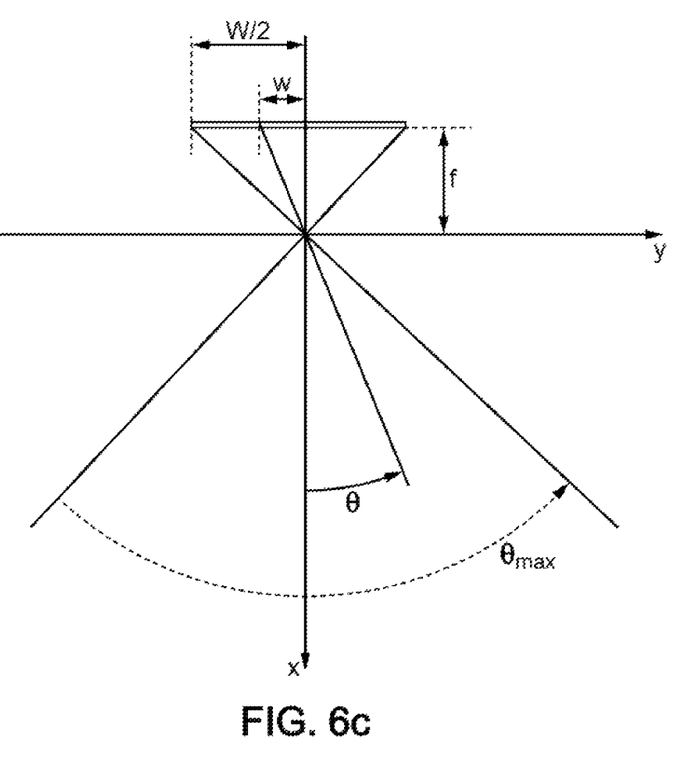

FIG. 6c shows how to associate the coordinates from the audio analysis with a position in the image, in order to determine the point around which the zoom should be applied.

It is assumed here that the camera's coordinate system is centered on the central point of the image of width W and height H. FIG. 6c represents only the horizontal plane (x, y) given in FIG. 6b.

It is assumed here that the camera has a horizontal field of view (FOV) with a value of $\theta_{max} < 180°$. As an example, we are considering $\theta_{max} = 90°$.

The width of the image captured by the camera is W. When a source is located at the edge of the field of view, the position on the image is more or less (+/−) W/2 depending on whether the source is to the left or to the right.

It is assumed here that an active source (received by means of the transmitted direction information) is located at an azimuth $\theta$ such that $|\theta| \theta_{max}/2$.

It is assumed here that the orientation of the image is normal, and therefore that a source located to the right has a coordinate w<0. The position won the image associated with an audio source of azimuth $\theta$ can be calculated using trigonometry by calculating:

$$\tan(\theta_{max}/2) = (W/2)/f$$

$$\tan(\theta) = w/f$$

where f is the focal length of the camera, which gives:

$$w = -(W/2)\tan(\theta)/\tan(\theta_{max}/2)$$

As W corresponds to a number (integer) of pixels, we can round the result, replacing w with:

$$w = -[(W/2)\tan(\theta)/\tan(\theta_{max}/2)]$$

where [x] represents the rounding to the integer nearest to x.

However, in one main embodiment, we can reverse the x axis to have an orientation that is horizontally "flipped" (or "mirrored"), which gives:

$$w=[(W/2)\tan(\theta)/\tan(\theta_{max}/2)]$$

This formula can be simplified with the following approximation:

$$w=[(W/2)/(\theta_{max}/2)\cdot\theta]$$

This approximation amounts to applying a linear relation between the length of the arc defined by the two angles ($\theta_{max}/2$) and $\theta$ and the corresponding "projection" on the plane of the camera.

In the same manner and assuming an inverted vertical image, for a source of elevation $\phi$, we can determine the vertical position z (relative to the center of the image) as:

$$h=[(H/2)\tan(\phi)/\tan(\phi_{max}/2)]$$

where $\phi_{max}$ is the vertical field of view of the camera (for example $\phi_{max}=40°$).

As for the horizontal case, we can also approximate this value by:

$$h=[(H/2)/(\phi_{max}/2)\cdot\phi]$$

Again we assume that the source is within the field of view of the camera, so $|\phi|\leq\phi_{max}/2$.

Thus upon reception 610-604 of the metadata indicating the position ($\theta,\phi$) of an active source, the video zoom 603 can be carried out as follows.

If a source is present (within the area of interest which typically corresponds to the field of view of the camera, or even to a wider area):
  calculate w,h as above, to identify the position around which the zoom is to occur
  set a fixed zoom factor fac (for example fac=2)
  perform the zoom using the above position and zoom factor parameters as follows, for example by means of CSS3 instructions, as follows:
  modify the style using a 'scale(fac)' routine on the HTML5 element of the remote video (for example called rv.style where rv stands for "remote video" and corresponds to the HTML element of the remote video),
  translate the style of an HTML5 division tag (typically denoted "div") surrounding the remote video, based on the determined position (w,h).

If no source is present (within the area of interest corresponding for example to the field of view of the camera) or if several sources are present: zoom back out, which amounts to applying CSS3 instructions to set the scale factor to 1 and doing a translation to (0,0).

In a variant, the zoom factor can be calculated based on detection of the face and on the apparent dimensions of this face in the captured images, making it possible to determine the distance from the audio source implicitly.

Figure 7A:
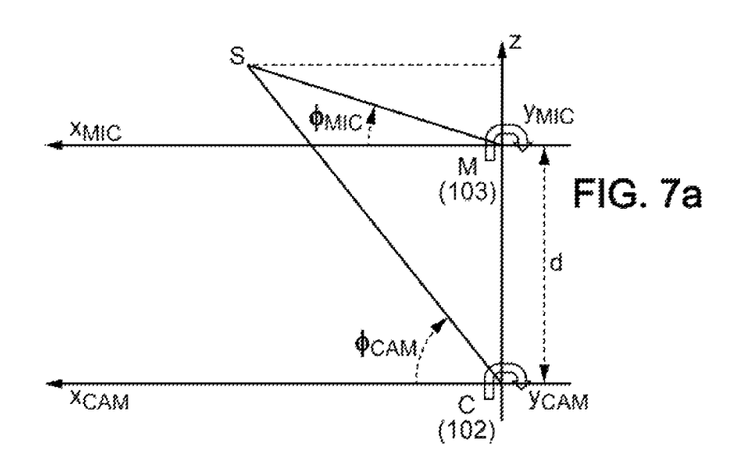
Figure 7B:
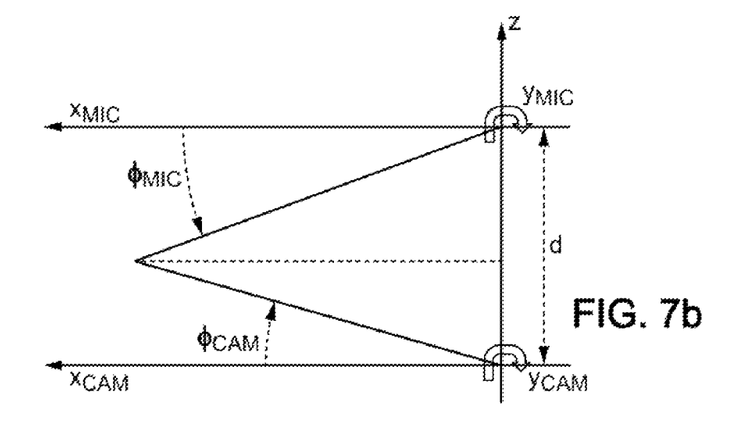
Figure 7C:
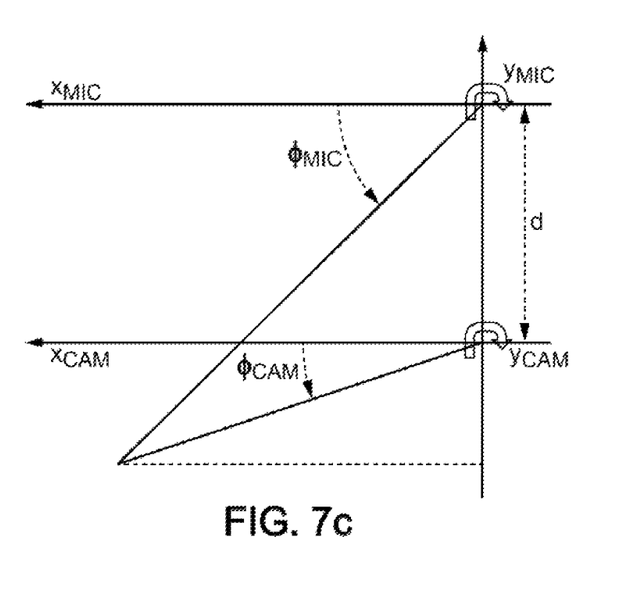

Referring now to FIGS. 7a, 7b, and 7c, an embodiment will now be described wherein the camera 102 and the microphone 103 are only coincident for the azimuth, but an offset is present for the elevation. Denoted below are the elevation determined by the microphone $\phi_{MIC}$ and the elevation required for zooming the video $\phi_{CAM}$.

If distance information is not available, a calibration step using a video "test pattern" can be carried out.

If the distance d between the microphone 102 and the camera 103 is available, as well as an estimate of a distance for example by means of facial detection and an estimate by regression between the size of the face and the estimated distance in the video image, a correspondence can be deduced.

In FIG. 7a, based on the triangle defined by the points S (audio source), M (microphone reference point), and C (camera reference point), we can write using the Law of Sines:

$$d/\sin(\phi_{CAM}-\phi_{MIC})=d_{CAM}/\sin(\pi/2+\phi_{MIC})$$

where d is the distance between the camera and the microphone (between C and M) and $d_{CAM}$ is the distance between the audio source and the camera (between S and C). This gives:

$$\phi_{CAM}=\phi_{MIC}+\arcsin(d/d_{CAM}\cos(\phi_{MIC}))$$

The other FIGS. 7b and 7c illustrate the same processing. It is therefore possible to convert the angle $\phi_{MIC}$ estimated at the reference point of the microphone, if the two distances are known:
  distance d between camera and microphone
  distance $d_{CAM}$ between audio source and camera This triangulation is possible by combining the information on the direction of the microphone and the distance from the camera.

The same compensation principle (triangulation) may apply if the camera and the microphone are at the same level (in terms of elevation) and if there is an azimuthal offset. In this case, compensation will be applied to angle $\theta_{MIC}$ in order to obtain angle $\theta_{CAM}$.

A calibration process is described below which makes it possible to obtain the abovementioned compensation, before making the call or during the call.

We can first use a static calibration which assumes that only one participant is within the field of view of the camera (and within the area of interest of the microphone). The angle $\phi_{MIC}$ (in degrees) estimated in real time is displayed. Optionally, we can also detect the participant's face and calculate the "center" of this face in order to deduce angle $\phi_{CAM}$ using the formula:

$$h=[(H/2)\tan(\phi)/\tan(\phi_{max}/2)], \text{ which is } \phi=\arctan(h/(H/2))$$

or $$h=[(H/2)/(\phi_{max}/2)\cdot\phi]$$

For a given distance to the camera and to the microphone and without knowing distance d, we can thus compensate in a fixed manner for the difference $\phi_{CAM}-\phi_{MIC}$.

We can also use a calibration to estimate regression automatically (for example by a technique called machine learning, for example such as a random forest regression type of regression or an artificial neural network) which associates the size of a face and the distance $d_{CAM}$. It is again assumed here that only one participant is present within the field of view of the camera. Knowing the distance d between the microphone and the camera, we can note in real time angle $\phi_{MIC}$, angle $\phi_{CAM}$ deduced from the central position of the face, and from this deduce the estimated distance $d_{CAM}$ and also note the size of the face (in terms of a dimension of an ellipse or rectangle surrounding the face).

Although the present disclosure has been described with reference to one or more examples, workers skilled in the art will recognize that changes may be made in form and detail without departing from the scope of the disclosure and/or the appended claims.

The invention claimed is:

1. A method for processing a video sequence containing a succession of images of at least one participant speaker, captured by a wide-angle camera, the method comprising:
   capturing sound using a microphone comprising a plurality of sensors for capturing a sound field;
   processing audio data captured by the microphone in order to determine at least a value of an estimated angle between a direction of propagation of sound coming from the participant speaker, and an optical axis of the wide-angle camera;
   generating a signal comprising data of said value of the estimated angle, added to a stream of the captured video sequence and audio data;
   transmitting the generated signal to a receiving device; and
   using said generated signal by the receiving device for rendering the captured video sequence by zooming into an area around the participant emitting the sound, the value of the estimated angle being used for said zooming.

2. The method according to claim 1, wherein the microphone is of an ambisonic type.

3. The method according to claim 1, comprising processing the sound field captured by the microphone and representative of a sound scene comprising at least one sound source corresponding to the participant emitting a sound for which the direction of propagation is determined relative to the optical axis of the camera.

4. The method according to claim 3, comprising source separation processing in order to detect said source and determine the corresponding direction of propagation of the sound.

5. The method according to claim 3, comprising "beamforming" type processing to determine the direction of propagation of the sound coming from said source.

6. The method according to claim 1, wherein the microphone and the camera are placed in respective positions spatially offset from one another, the method comprising a calibration prior to the processing of the audio data, in order to correct the image area to be zoomed into while taking into account the spatial offset between microphone and camera.

7. The method according to claim 6, wherein said calibration comprises:
   comparing a position of the face of the participant in an image of the succession of images captured by the camera and the direction of propagation of the sound from this active participant, picked up by the microphone,
   determining said spatial offset based on the comparison, and storing a value of the spatial offset, in order to take said offset value into account to define the area for the zoom.

8. The method according to claim 7, comprising facial shape detection in the images captured by the camera during said calibration.

9. The method according to claim 1, wherein the data of said angle value are transmitted with the stream of the captured video sequence and audio data, in metadata.

10. The method according to claim 1, wherein the data of said angle value are transmitted with the stream of the captured video sequence and audio data via a switched telephone network type of network.

11. A transmitting device comprising:
   a wide-angle camera;
   a microphone comprising a plurality of sensors for capturing a sound field; and
   a processing circuit connected to the camera and the microphone, said processing circuit comprising a transmitting interface and being configured to process a video sequence containing a succession of images of at least one participant speaker, captured by the wide-angle camera, the processing of the video sequence comprising:
   capturing sound using the microphone;
   processing audio data captured by the microphone in order to determine at least a value of an estimated angle between a direction of propagation of sound coming from the participant, and an optical axis of the wide-angle camera;
   generating a signal comprising data of said value of the estimated angle, added to a stream of the captured video sequence and audio data; and
   using said transmitting interface to transmit said generated signal towards a receiving device.

12. A receiving device, comprising:
   a receiving interface for receiving a signal comprising a video and audio data stream corresponding to a video sequence containing a succession of images of at least one participant speaker, said video sequence having been captured by a wide-angle camera, said signal comprising, in addition to the video and audio data stream, a value of an estimated angle between a direction of propagation of sound coming from said participant speaker, and an optical axis of the wide-angle camera; and
   a processing circuit is configured to use said signal for rendering the captured video sequence by zooming into an area around the participant speaker emitting the sound, the value of the estimated angle being used for said zooming.

13. A non-transitory computer storage medium, storing code instructions of a computer program, said code instructions causing implementing a method for processing a video sequence when instructions are executed by a processor of a processing circuit, the video sequence containing a succession of images of at least one participant speaker, captured by a wide-angle camera, the method comprising:
   capturing sound using a microphone comprising a plurality of sensors for capturing a sound field;
   processing audio data captured by the microphone in order to determine at least a value of an estimated angle between a direction of propagation of sound coming from the participant speaker, and an optical axis of the wide-angle camera; and
   generating a signal comprising data of said value of the estimated angle, added to a stream of the captured video sequence and audio data;
   transmitting the generated signal to a receiving device; and
   using said generated signal by the receiving device for rendering the captured video sequence by zooming into an area around the participant emitting the sound, the value of the estimated angle being used for said zooming.

14. The method according to claim 1, wherein the stream of the captured video sequence and audio data is a videoconference data stream.

* * * * *